(12) United States Patent
Kolonia, Sr.

(10) Patent No.: US 7,278,495 B2
(45) Date of Patent: Oct. 9, 2007

(54) HORSESHOE

(76) Inventor: Robert A. Kolonia, Sr., #5 Agnes La., Milford, NJ (US) 08848

( * ) Notice: Subject to any disclaimer, the term of this patent is extended or adjusted under 35 U.S.C. 154(b) by 333 days.

(21) Appl. No.: 11/085,831

(22) Filed: Mar. 21, 2005

(65) Prior Publication Data

US 2005/0217870 A1    Oct. 6, 2005

Related U.S. Application Data

(63) Continuation-in-part of application No. 10/226,098, filed on Aug. 21, 2002, now Pat. No. 6,868,914.

(51) Int. Cl.
*A01L 3/00* (2006.01)

(52) U.S. Cl. .......................................... 168/4
(58) Field of Classification Search ................... 168/4, 168/14
See application file for complete search history.

(56) References Cited

U.S. PATENT DOCUMENTS

| | | | |
|---|---|---|---|
| 172,473 A | 1/1876 | Olds | |
| 641,130 A | 1/1900 | Mears et al. | |
| 924,790 A | 6/1909 | Kane | |
| 1,702,882 A | 2/1929 | Tweed | |
| 3,664,428 A | 5/1972 | Spencer | |
| 3,921,721 A | 11/1975 | George | |
| 4,579,004 A * | 4/1986 | Kalthoff et al. | 73/799 |
| 4,655,293 A | 4/1987 | Criner et al. | |
| 4,703,217 A * | 10/1987 | Ratzlaff et al. | 310/338 |
| 4,878,541 A | 11/1989 | Pedersen | |
| 4,916,288 A * | 4/1990 | Redden | 219/228 |
| 5,137,092 A | 8/1992 | Tuunanen | |
| 5,172,766 A | 12/1992 | Adkins | |
| 5,230,384 A | 7/1993 | Nebel et al. | |
| 5,287,931 A | 2/1994 | Eriksson | |
| 5,636,695 A | 6/1997 | Watson, Jr. et al. | |
| 6,038,935 A | 3/2000 | Fullen et al. | |
| 6,076,607 A | 6/2000 | Bergeleen | |
| 6,082,462 A | 7/2000 | Lyden | |

\* cited by examiner

*Primary Examiner*—Rob Swiatek
(74) *Attorney, Agent, or Firm*—William H. Eilberg

(57) ABSTRACT

A horseshoe includes a thin, resilient member, embedded in a moldable material such as plastic or composite. Due to this dual construction, the horseshoe is strong yet light in weight. The moldable material has a thickness which varies across the horseshoe, so as to define a cavity in the space between the shoe and the horse's hoof. A channel, formed in the moldable material, provides access to the cavity, which can be filled with a medicated material after the shoe has been attached to the hoof. In an alternative embodiment, a source of current can be connected across the ends of the resilient member, causing the resilient member to function as a resistance heater, which can melt an adhesive used to attach the shoe to the hoof. The latter alternative can also be practiced with conventional all-metal horseshoes, or with an insulating horseshoe that is provided with an external conductive element.

10 Claims, 7 Drawing Sheets

HORSESHOE

CROSS-REFERENCE TO PRIOR APPLICATION

This is a continuation-in-part of U.S. patent application Ser. No. 10/226,098, filed Aug. 21, 2002, now U.S. Pat. No. 6,868,914.

BACKGROUND OF THE INVENTION

The present invention relates to the field of horseshoes, and provides a horseshoe which is light in weight, yet strong enough to withstand prolonged impact stresses.

A horse is a large animal, typically weighing about 800-1400 pounds. When a horse runs at speeds up to 40 miles per hour, the load placed upon the horse's leg can exceed 15,000 pounds. Thus, the impact forces imposed on a horse's hoof, while the horse is running, can be enormous. The potential for injury to the horse is great, whenever the horse is training or racing.

Horseshoes have been used for centuries to protect the horse's hoof and to enable the horse to gallop more rapidly and more comfortably. Horseshoes have traditionally been made of metal, which is strong enough to protect the hoof. To reduce the weight and expense of the horseshoe, it has been proposed to use relatively light-weight metals such as aluminum alloys.

More recent studies of the gait of horses have shown that a horse's hoof, in the unshod natural state, will flex and widen somewhat when loaded. The use of relatively rigid, metallic horseshoes tends to prevent such natural movement, and thus impairs the horse's natural ability to absorb shocks. For this reason, it has been proposed to make horseshoes of flexible materials such as plastic, rubber, or composites, as described in U.S. Pat. No. 6,082,462, the disclosure of which is incorporated by reference herein. Horseshoes made of plastics or rubber, or the like, have not been successful, in part because they do not have the durability of metal.

The above-cited patent also describes "bonded" horseshoes, in which non-metallic materials, such as plastic or rubber, are combined with metal horseshoes in various ways. In general, such bonded horseshoes effectively provide one or more layers of plastic or rubber, in addition to the conventional metallic horseshoe. The added layer(s) will elevate the horse's hoof, beyond the elevation of the conventional horseshoe, and therefore places the horse's hoof in an unstable and more risky position, one which may be harmful to the health of the hoof.

In the prior art, it has been traditional practice to attach a horseshoe by nailing it into the hoof. However, nails can be mis-driven, and can cause damage to the hoof. This damage is apparent when the horse is seen to limp. Sometimes, a hoof is so damaged that it is nearly impossible to fasten a horseshoe with nails. Moreover, nails can wear down, and pull through the horseshoe.

The problems associated with nailing a horseshoe to a hoof can be solved, at least in theory, by attaching the shoe to the hoof with a strong adhesive, such as an epoxy. In practice, this solution has not been satisfactory. If the adhesive is strong enough to hold the horseshoe to the hoof for extended periods, then it may be very difficult or impossible to remove, especially without causing pain to the horse or damage to the hoof. If the adhesive is weak enough that the shoe can be removed without too much effort, it is usually too weak to hold the shoe in place during a period of extended use.

The present invention provides a horseshoe which has the advantages of a metal shoe, namely strength and durability, as well as the advantages of horseshoes made of flexible materials. Also, the horseshoe of the present invention does not unduly elevate the horse's hoof, and therefore does not cause injury. The horseshoe of the present invention also provides protection for the sensitive middle area of the hoof. Another aspect of the invention makes it feasible to attach a horseshoe by adhesives instead of nails.

SUMMARY OF THE INVENTION

The present invention comprises a horseshoe that includes a resilient insert, formed into a C-shaped member, the insert being embedded in a moldable material, such as plastic or composite. A preferred material for the insert is spring steel, and a preferred moldable material is polyurethane. The insert may have a U-shaped cross-section, so as to provide support for nails used to attach the shoe to a hoof.

The C-shaped insert defines an interior region, and the moldable material extends substantially across this entire interior region. Thus, the horseshoe has the form of a generally solid piece. This solid construction has the advantage that it substantially covers the hoof, and therefore tends to prevent debris from reaching the hoof. Also, the solid construction distributes the weight of the shoe in a relatively uniform manner, as compared with horseshoes of the prior art.

The moldable material includes an area of reduced thickness, which defines a membrane that forms a cavity, known as a commissure, near the hoof, when the shoe is attached. A channel formed in the moldable material provides access to the cavity, to allow medicated substances to be injected into the cavity.

In another embodiment, the horseshoe is provided with means for applying an electric current across the ends of the insert, so that the insert becomes a resistance heater. Heat generated by the electric current can loosen an adhesive that attaches the shoe to the hoof. By providing a means for removing a high-strength adhesive by heat, and without causing pain to the horse, the invention makes it feasible to use very strong epoxy adhesives, instead of nails, as a means of attachment.

The above embodiment can also be used with conventional metal horseshoes that are affixed to the hoof with an epoxy or other adhesive, and without nails. Since the horseshoe is metal and therefore electrically conductive, electrodes from a battery or other current source can be attached directly to the horseshoe. Current is made to flow through the horseshoe, causing its temperature to rise, and causing the adhesive to loosen. The horseshoe can be easily removed, and the residual adhesive scraped off. The horseshoe can then be re-used.

In still another embodiment, the exterior of the horseshoe is an insulator, but there is an electrically conductive element sandwiched between the horseshoe and the hoof. When electric current is made to flow through that element, it becomes hot enough to soften the adhesive that surrounds it, so that the shoe can be removed.

The combination of the resilient insert and the moldable material is particularly advantageous because the shoe has the strength and rigidity imparted by the insert, while still being relatively light in weight, due to the use of the moldable material for the majority of the body of the shoe.

The present invention therefore has the primary object of providing a horseshoe which is strong yet light in weight.

The invention has the further object of providing a horseshoe which is likely to be comfortable to a horse, and which is unlikely to cause pain or injury.

The invention has the further object of providing a horseshoe which absorbs impact forces more effectively than conventional metal shoes.

The invention has the further object of providing a horseshoe that can be comfortably worn by a horse for an extended period of time, such as a period of the order of six weeks or more.

The invention has the further object of providing a horseshoe which shields the hoof from debris and other harmful substances.

The invention has the further object of providing a horseshoe having means for medicating a horse's hoof while the shoe is attached to the hoof for extended periods.

The invention has the further object of making it feasible to attach a horseshoe using a strong adhesive, thus reducing or eliminating the need for nails as a means of attachment.

The invention has the further object of making it practical to use an epoxy or other strong adhesive to apply conventional all-metal horseshoes to a hoof, by providing an electrical means for loosening said adhesive.

Other objects and advantages of the present invention will be apparent to the reader skilled in the art, from the following brief description of the drawings, the detailed description of the invention, and the appended claims.

DETAILED DESCRIPTION OF THE INVENTION

Figure 1:
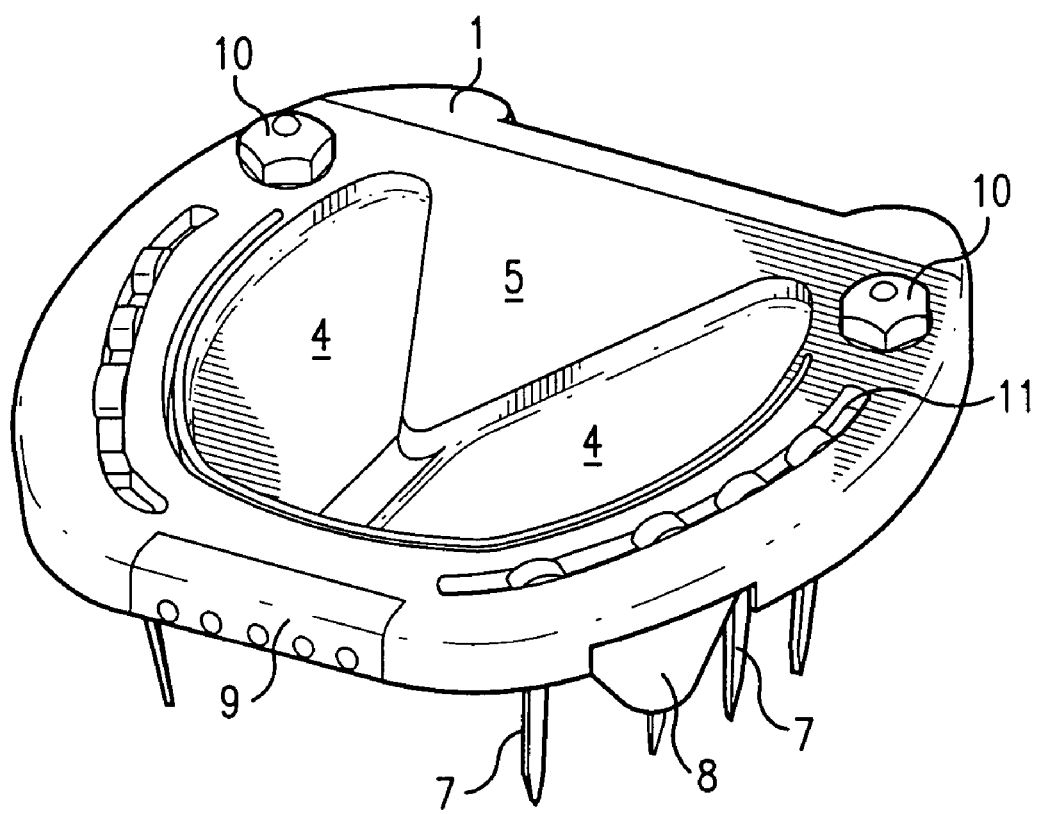
FIG. 1 provides a perspective view of the horseshoe of the present invention, showing the bottom of the horseshoe, i.e. the side that touches the ground.
Figure 2:
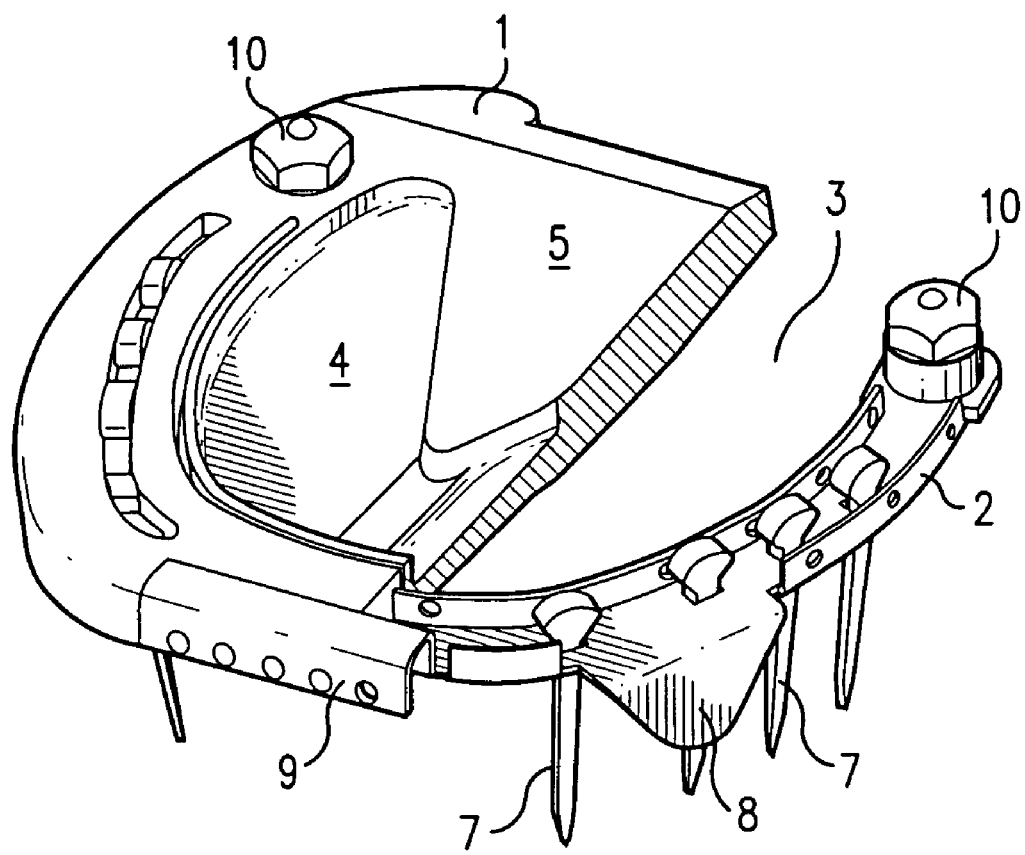
FIG. 2 provides a partially cut-away perspective view of the horseshoe, from the same position as shown in FIG. 1, exposing a portion of the insert forming part of the shoe.

FIG. 1 provides a perspective view of the horseshoe of the present invention. FIG. 1 shows the bottom of the horseshoe, i.e. the portion which touches the ground when the shoe is worn. FIG. 2 provides a partially cut-away view, showing the insert.

The main body 1 of the horseshoe is formed of a moldable plastic or composite material. A resilient insert 2 is embedded in the body. The main body of the insert is completely embedded in the moldable material, and is therefore not visible in FIG. 1, but it is partially visible in the cut-away view of FIG. 2.

The insert is preferably made of a strong but resilient material. A preferred material is spring steel. In one example, the steel could be about 0.055 inches thick. However, the invention is not limited to the use of a particular material, or to a specific thickness. Many other resilient materials could be used instead. It is preferred that the insert have "memory", and that it be capable of being held under compression. It is also preferred that the insert be relatively thin, i.e. the thickness of the insert should be substantially less than that of the body of the shoe.

The cut-away view of FIG. 2 exposes a portion of the insert 2. The insert is curved to define the shape of a "C". Equivalently, the shape of the insert can be characterized as that of a conventional horseshoe. Because the insert is C-shaped, or horseshoe-shaped, it is generally symmetrical, so the portion of the insert not visible in FIG. 2 is a mirror image of the portion that is explicitly shown.

As shown in FIG. 2, the insert 2 has a U-shaped cross-section. The plastic or composite material defining the body 1 is molded over the insert, as shown. It is preferred that the material used to make the insert be capable of being formed into a member having the U-shaped cross-section shown in the figures. However, the invention could be practiced with inserts having other cross-sections.

The insert defines an interior region 3, i.e. the region inside the "C", which region is occupied by the body 1. The body includes a relatively thin membrane portion 4 and a relatively thick frog portion 5. In effect, some of the material defining the body is hollowed out to define the relatively thin membrane. The thicker frog portion 5 provides support for the rear of the hoof as it impacts the ground. The membrane extends across those parts of the interior region that are not covered by the frog portion. Thus, the membrane, in conjunction with the frog, provides a protective cover for the hoof, preventing snow, dirt, stones, and other objects from reaching or penetrating the sensitive area of the hoof.

The membrane 4 and frog 5 help to define a shoe that has a relatively uniform distribution of weight across the total area of the hoof. This arrangement contrasts with conventional horseshoes, which have traditionally been formed of a piece of metal extending only along the periphery of the hoof. The relatively uniform distribution of weight of the horseshoe of the present invention reduces stress on the hoof, and enables the horse to walk or gallop more comfortably.

The combination of the insert 2 and the moldable body 1 is especially advantageous. The horseshoe derives strength and rigidity from the strength of the insert. But the weight of the shoe is reduced by the use of the moldable plastic material to make the majority of the body of the shoe. It turns out that the weight of the horseshoe shown in FIG. 1 is approximately one-third of the weight of a comparable horseshoe made entirely of steel. Thus, the density of the moldable material is substantially less than that of the insert.

Because the body of the horseshoe is made of a moldable material, the horseshoe of the present invention absorbs impact forces more effectively than conventional metal horseshoes of the prior art.

The U-shaped cross-section of the insert provides a convenient support, and partial enclosure, for nails 7 used to attach the shoe to the hoof. The nails extend through suitable holes (not visible in the figures) formed in the insert. The nail holes are located in recesses 11, formed in the body 1, which recesses allow access to the nails. The recesses coincide with the U-shaped cross-sectional structure of the insert; the U-shaped structure may be used, during molding, to keep the moldable material out of the area where the nails will be supported. Preferably, the height of the U-shaped structure, and therefore the height of the recess, is greater than the height of the head of the nail, so that the head of the nail does not protrude beyond the bottom surface of the insert, and therefore does not reach the surface that impacts the ground.

The insert 2 is provided with clips 8, which help to prevent the shoe from sliding relative to the hoof, and thus prevent overloading of the nails. Clips of this type have been known before, but the novel aspect of the present construction is that the clips are part of the insert described above. The clips are preferably integrally formed with the insert, but they could also be separately formed and suitably joined.

Figure 3:
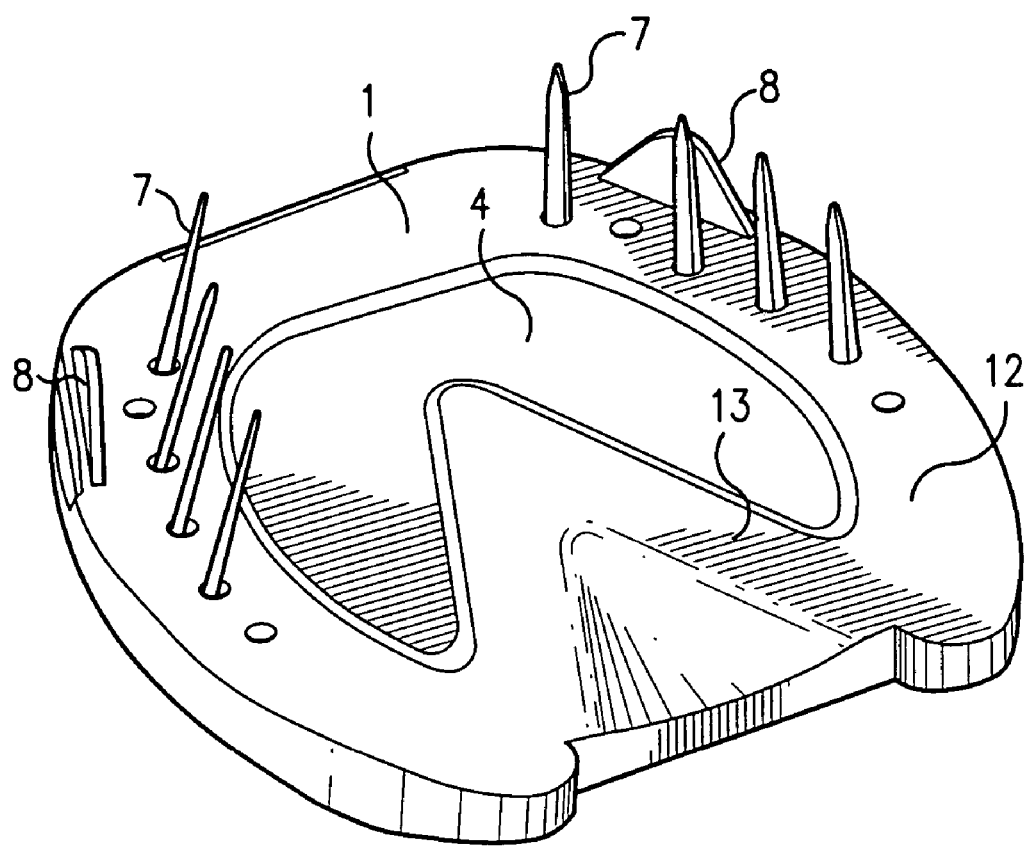
FIG. 3 provides a perspective view of the horseshoe of the present invention, showing the top of the horseshoe, i.e. the side that abuts the horse's hoof.
Figure 4:
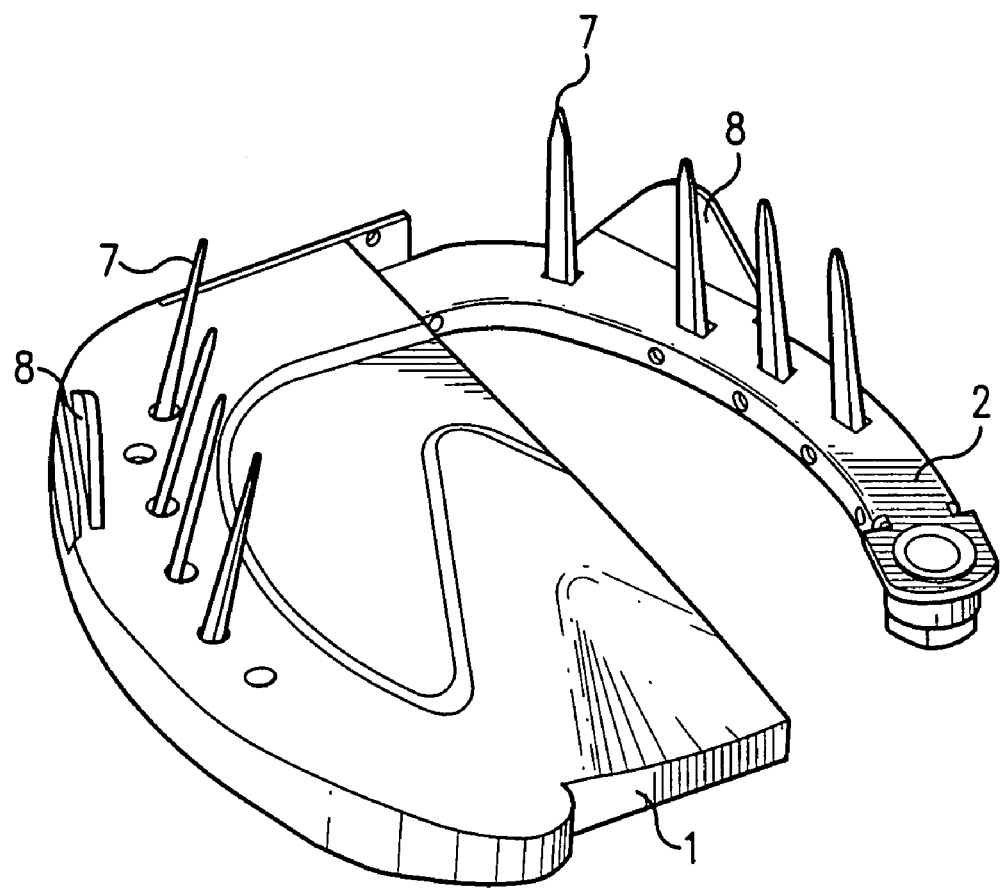
FIG. 4 is similar to FIG. 3, except that it provides a cut-away perspective view of the top portion of the horseshoe.

FIGS. 3 and 4 which show perspective views, in full and cut-away form, respectively, of the top portion of the shoe, i.e. the portion abutting the hoof. These figures more clearly illustrate the nails and the clips. As in FIG. 2, FIG. 4 shows only about half of the main body of the insert 2. But the insert is symmetrical, and the portion that is covered by the moldable material is a substantial mirror image of the portion that is exposed in FIG. 4.

The insert may also include tip 9, for protecting the leading edge of the shoe. Although a tip is known in the prior art, the present construction is novel insofar as the tip is formed as part of, or is attached to, the insert. The tip can be made of a hardened metal, such as a carbide, and then attached to the insert.

As described above and as shown in the figures, the entire main body of the insert (i.e. all portions except the clips and the tip) is encased within the moldable material. This construction provides the following additional advantage. When the shoe has been worn for an extended period of time, and especially if the horse has been running or walking a great deal, the moldable material will wear down, and eventually the insert will become exposed. When the insert is exposed to the outside, it is appropriate to change the shoe. The insert thus provides a convenient indicator of when the shoe should be changed.

The horseshoe of the present invention is intended to remain on the horse's hoof for an extended period of time, typically for six weeks or more. The invention should not be deemed limited to this time period however. The useful life of a given shoe may be more or less than six weeks, depending on how the shoe is worn.

The insert also provides threaded receptacles for receiving studs 10. The studs are useful to prevent injury to the horse, especially when the horse jumps. Immediately after a horse jumps over a barrier, the hoof strikes the ground with a skidding motion. The studs prevent excessive skidding, and tend to allow just the desired amount. Although studs themselves are not new, the present invention provides a novel and convenient means for attaching and supporting such studs, namely through the use of the inserts.

The preferred materials to be used in making the body 1 of the horseshoe are urethane and polyurethane. For example, the horseshoe of the present invention has been made with thermoplastic polyurethanes sold under the trademark Texin, especially Texin 255 and Texin 270, available from the Bayer Corp., of Elkhart, Ind. The horseshoe has also been made with the polyurethane product sold under the trademark Estane, of the B.F. Goodrich Company. Other moldable materials could also be used, and the invention is not limited to the examples given above, or to any other specific material.

As shown in FIG. 3, the top portion of the shoe includes an edge portion 12 and a top portion 13 of the frog. The edge portion and the frog define surfaces that lie in essentially the same plane, as shown in the figure. The latter plane is at a different level than the plane of the membrane 4. When the shoe is attached to the hoof, the surfaces of the edge portion 12 and the top portion 13 of the frog come into abutment with the hoof. It can therefore be appreciated, from FIG. 3, that when the shoe is attached to the hoof, there is a cavity adjacent to the hoof, defined by the membrane 4, the edge portion and frog, and the hoof itself. This cavity is known in the art as a commissure. The extent to which the membrane is thinner than the edge portion 12 and the frog 13 determines the height of the cavity.

While the membrane serves the useful purpose of preventing debris from contacting the hoof, the cavity, or commissure, defined by the membrane may itself cause problems by harboring bacteria, mold, dirt, and/or moisture. The alternative embodiment shown in FIG. 5 is intended to reduce or eliminate this problem.

Figure 5:
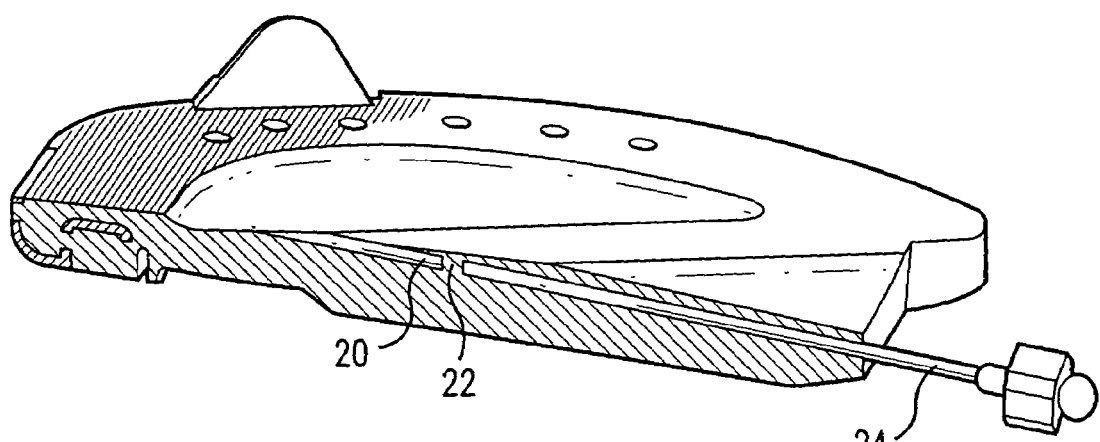
FIG. 5 provides a cut-away perspective view of a portion of the horseshoe of the present invention, showing an embodiment which provides a channel for injecting a medicated substance into the commissure, i.e. the region between the horse's hoof and the horseshoe of the present invention.

FIG. 5 shows a fragmentary perspective view of the top portion of the shoe, i.e. the portion immediately adjacent to the hoof. A channel 20 is formed in the body, preferably in the relatively thick frog portion. A needle 24 is inserted into the channel, the channel communicating with the cavity, making it possible to inject a medicated substance, or other substance, into the cavity. In the preferred embodiment, a barrier 22 is provided which initially blocks the channel, but which is intended to be punctured by the needle. The medicated substance can then be forced into the cavity via the needle, using a cartridge gun-type dispenser.

Preferably, the barrier 22 is located relatively deep inside the frog, as shown in the drawing, so that a substantial portion of the channel can be used as a guide for inserting the needle. Thus, in the most preferred arrangement, the needle is inserted into the channel, and does not puncture the barrier until the needle has been inserted to a substantial depth.

The substance to be injected into the cavity is preferably a silicone-based material that contains medications appropriate for promoting the health of the hoof. At the very least, such material, by filling the cavity, prevents unwanted moisture, dirt, or mold from entering the cavity. The material is preferably relatively viscous, and designed to "set" in air, i.e. to harden somewhat, while still remaining pliable. Thus, after the material has set, it is unlikely to flow out of the cavity, even though the barrier has been punctured.

Although the embodiments described above have included nails as a means of attachment of the shoe, it has been explained that nails are disadvantageous. It would be desirable to attach a horseshoe solely by means of an adhesive. In the prior art, attachment by adhesives has been generally unsuccessful, because if the adhesive is good enough to substitute for a nail, then the adhesive is likely to be so strong that the shoe is almost impossible to remove. The embodiment of the present invention shown in FIG. 6 is intended to solve this problem.

Figure 6:
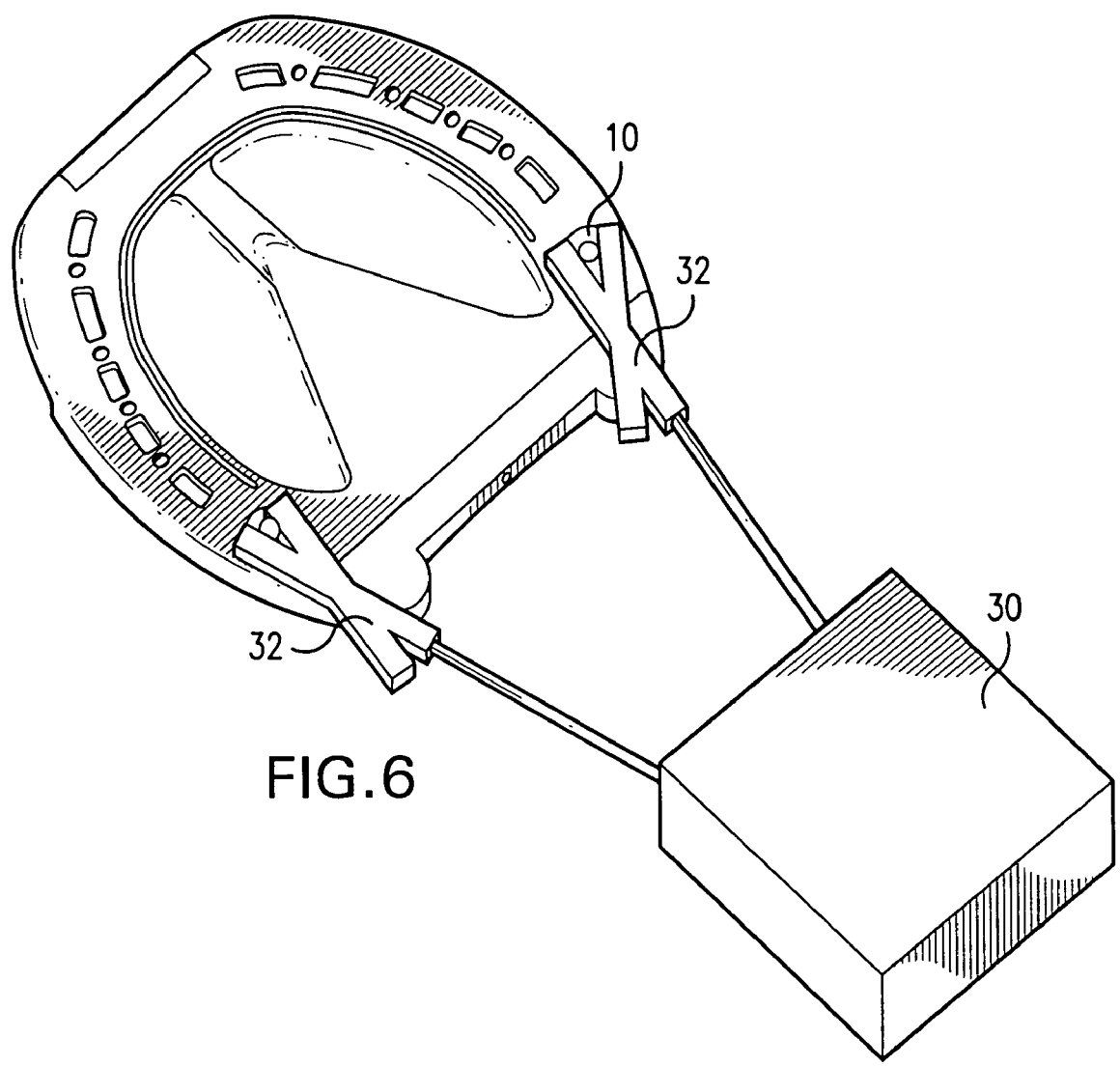
FIG. 6 provides a perspective view of another embodiment of the horseshoe of the present invention, wherein the horseshoe includes a heating means.

In FIG. 6, a battery 30 (or other suitable source of electric current) is connected to the studs 10 of the insert 2, by means of clips 32. The studs are useful for this purpose, because they are electrically connected to the insert, but the connections to the insert could be made at locations other than at the studs, if necessary. In this embodiment, the insert should be made of metal, or of some other material capable of conducting electricity. In effect, the horseshoe comprises an elongated electrical conductor embedded in an electrical insulator. When voltage is applied across the ends of the insert, the insert becomes a resistance heater, as the flowing current causes the insert to become hot. If an epoxy adhesive is used to attach the shoe, heating the epoxy will loosen the adhesive, until the shoe can be easily removed.

FIG. 6 also represents another variation, wherein the horseshoe is of conventional all-metal construction. In this case, the entire horseshoe is electrically conductive. Clips 32, which are connected to battery 30, are then connected at two points on the horseshoe. Preferably, the clips are connected at different ends of the horseshoe, so that current will flow through most or all of the horseshoe. When electric current flows through it, the horseshoe becomes hot. When the current through the horseshoe is maintained, the temperature of the horseshoe continuously increases, until the temperature reaches the melting point, or softening point, of the adhesive. The horseshoe can then be easily removed from the hoof.

The current supplied to the horseshoe is preferably direct current (DC), such as is obtained from a battery.

In one example, the DC current is provided by a 12-volt battery. As current continues to flow through the horseshoe, its temperature increases steadily, until it reaches the range of about 300-450° F., which is the temperature range in which many adhesives, such as epoxy adhesives, begin to break down. The horseshoe can then be easily removed. The invention is not limited by the above example. The invention could be practiced with other voltages, from other sources, and the current could instead be alternating current (AC).

In practice, some adhesive will remain on the shoe, but most or all of it can be easily scraped off. It is desirable to pass the electric current through a major portion of the horseshoe, so that substantially all of the horseshoe becomes heated, and so that enough of the adhesive is effectively loosened.

The above embodiment can be used to remove an adhesively-affixed horseshoe, whether or not nails have been used in addition to the adhesive.

The battery can be connected directly to the horseshoe, or to any electrically conductive member that is attached to, or forms part of, the horseshoe.

It is preferred that the electric current be applied as a series of pulses, instead of continuously. The metallic horseshoe, or the metallic insert, if present, is normally a good electrical conductor, so connecting a battery to the shoe, or to the insert, creates a virtual short-circuit. Thus, the current flowing through the horseshoe or insert is relatively large, and the shoe will become heated very quickly. Pulsing the current is an effective way to control the heating, and to prevent damage to the battery. The current may be pulsed simply by repeatedly and manually opening and closing the circuit, or by operating a conventional pulsing circuit that is commercially available, and which accomplishes the same effect automatically.

Figure 7:
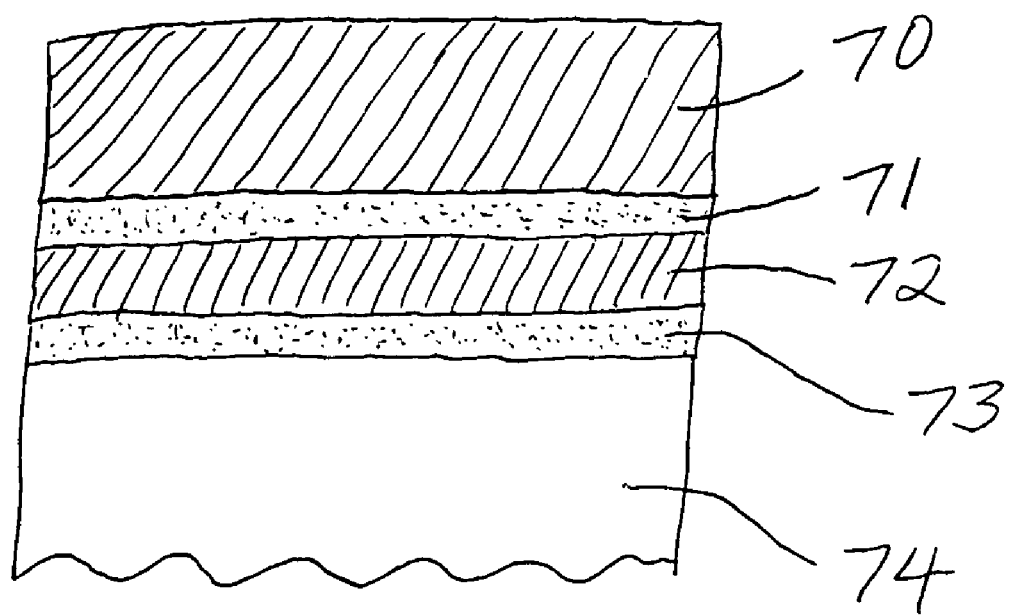
FIG. 7 provides a schematic cross-sectional view of an embodiment wherein an electrically conductive element is sandwiched between a horseshoe and a hoof.

FIG. 7 provides a schematic cross-sectional view of another embodiment of the invention. In this embodiment, at least the exterior of the horseshoe of made of an electrical insulator, such as plastic, and a conductive element is sandwiched between the horseshoe and the hoof. FIG. 7 shows a cross-section of horseshoe 70, a layer of adhesive 71, the electrically conductive element 72, another layer of adhesive 73, and the hoof 74. FIG. 7 shows these features in exaggerated proportions, for purposes of illustration. A battery, or its equivalent, is connected to the conductive element, in the same manner as suggested by FIG. 6. When current flows through that element, it becomes hot, and softens or melts the surrounding adhesive, making it easy to remove the horseshoe from the hoof. This embodiment can be used when the entire horseshoe is an insulator, or when the exterior surface of the horseshoe is an insulator, by providing a conductive element which is external to the horseshoe, and which can be used as a heating element for softening the adhesive.

Thus, one embodiment of the invention comprises a method of attaching and removing a horseshoe without the use of nails. The horseshoe is attached to the hoof by applying an epoxy or other strong adhesive, and is removed by applying a voltage across the electrically conductive insert, so as to heat the adhesive and thereby loosen it. The shoe can then be easily removed.

The use of the insert therefore makes it practical to attach the shoe by an adhesive, because the insert can be used as a resistance heater for conveniently loosening the adhesive. Alternatively, the external conductive element, described above, can be used for the same purpose. And, as also described above, the invention can simply be practiced with a conventional all-metal horseshoe. In all of these cases, the invention provides a method of avoiding the use of nails for attachment of the shoe.

The invention can be modified in many ways, as will be apparent to the reader skilled in the art. The exact composition of the insert and the moldable material can be varied. The shoe may be attached with nails only, or with an adhesive only, or with a combination of nails and an adhesive. Various structural features of the shoe, such as the studs, the clips, and the tip, may be included or not included, to suit the needs of the user. Thus, the insert may include only the basic C-shaped member embedded in the moldable material, or it may also include one or more attachments, such as studs, clips, or tips, which are affixed thereto, and which are visible after the moldable material has been formed over the main body of the insert.

The shoe can be made with or without the channel for injecting the medicated substance, also within the scope of the invention.

The above and other modifications should be considered within the spirit and scope of the following claims.

What is claimed is:

1. A method of attaching and removing a horseshoe, comprising:
    a) attaching the horseshoe by applying a quantity of an adhesive which is strong enough to hold the horseshoe on a hoof, wherein the horseshoe is selected to be made substantially entirely of an electrically conductive material,
    b) applying a voltage to the horseshoe so as to cause current to flow through the horseshoe, in an amount sufficient to cause the horseshoe to become hot and to loosen the adhesive, and
    c) removing the horseshoe after the adhesive has been loosened.

2. The method of claim 1, wherein the applying step comprises connecting a source of voltage to the horseshoe so as to cause electric current to flow through a major portion of the horseshoe.

3. The method of claim 1, wherein the applying step includes the step of electrically attaching a battery to the horseshoe.

4. The method of claim 1, wherein the horseshoe is selected to be of all metal construction.

5. The method of claim 1, further comprising the step of removing residual adhesive from the horseshoe, and re-using the horseshoe.

6. The method of claim 1, wherein the entire method is performed without use of any nails.

7. The method of claim 1, wherein step (b) is performed by applying the current in pulsed form.

8. A method of removing a horseshoe which has been affixed to a hoof using an adhesive, wherein an electrically conductive element is sandwiched between the horseshoe and the hoof, the method comprising attaching a source of electric current to the conductive element, passing electric current through the conductive element until the element becomes sufficiently hot that the adhesive becomes loosened, and removing the horseshoe from the hoof.

9. The method of claim 8, further comprising the step of removing residual adhesive from the horseshoe and/or the element, and re-using the horseshoe.

10. The method of claim 8, wherein the step of passing electric current is performed by applying the current in pulsed form.

* * * * *